United States Patent [19]

Sipple et al.

[11] Patent Number: 5,140,685
[45] Date of Patent: Aug. 18, 1992

[54] RECORD LOCK PROCESSING FOR MULTIPROCESSING DATA SYSTEM WITH MAJORITY VOTING

[75] Inventors: Ralph E. Sipple, Shoreview; Marvin W. Theis, Plymouth; John O. Sjolander, Vadnais Heights; John R. Jordan, St. Paul, all of Minn.

[73] Assignee: Unisys Corporation, Blue Bell, Pa.

[21] Appl. No.: 759,805

[22] Filed: Sep. 16, 1991

Related U.S. Application Data

[63] Continuation of Ser. No. 669,788, Mar. 15, 1991, abandoned, which is a continuation of Ser. No. 167,748, Mar. 14, 1988, abandoned.

[51] Int. Cl.$^5$ ............................. G06F 13/14
[52] U.S. Cl. ................... 395/425; 364/246.8; 364/267; 364/269.1; 395/600
[58] Field of Search ................... 395/425, 600

[56] References Cited

U.S. PATENT DOCUMENTS

| | | | |
|---|---|---|---|
| 3,551,892 | 12/1970 | Driscoll | 340/172.5 |
| 3,670,306 | 6/1972 | Fox et al. | 340/172.5 |
| 3,848,116 | 11/1974 | Moder et al. | 371/36 |
| 3,886,525 | 5/1975 | Brown et al. | 340/172.5 |
| 3,964,055 | 6/1976 | Carruet et al. | 340/172.5 |
| 4,099,234 | 7/1978 | Woods et al. | 364/200 |
| 4,118,771 | 10/1978 | Pomella et al. | 364/101 |
| 4,153,934 | 5/1979 | Sato | 364/200 |
| 4,214,305 | 7/1980 | Tokita et al. | 364/200 |
| 4,300,192 | 11/1981 | Couleur et al. | 364/200 |
| 4,318,182 | 3/1982 | Bachman et al. | 364/200 |
| 4,354,227 | 10/1982 | Hays, Jr. et al. | 364/200 |
| 4,394,728 | 7/1983 | Comfort et al. | 364/200 |
| 4,395,753 | 7/1983 | Comfort et al. | 364/200 |
| 4,402,046 | 8/1983 | Cox et al. | 364/200 |
| 4,403,285 | 9/1983 | Kikuchi | 364/200 |
| 4,414,624 | 11/1983 | Summer, Jr. et al. | 364/200 |
| 4,419,724 | 12/1983 | Branigin et al. | 364/200 |
| 4,426,681 | 1/1984 | Bacot et al. | 364/200 |
| 4,445,174 | 4/1984 | Fletcher | 364/200 |
| 4,480,304 | 10/1984 | Carr et al. | 364/200 |
| 4,649,475 | 3/1987 | Scheuneman | 364/200 |
| 4,663,709 | 5/1987 | Fujiwara et al. | 364/200 |
| 4,698,752 | 10/1987 | Goldstein et al. | 364/200 |
| 4,709,325 | 11/1987 | Yajima | 364/200 |

OTHER PUBLICATIONS

Ball, Michael and Hardle, Fred, "Self-Repair in a TMR Computer," Computer Design, Feb. 1969, pp. 54–57.
Author, Unknown "Function-to-Function Architecture," Electronic Design, Sep. 3, 1981, pp. 143–156.
Roberts, Michael, "Multiprocessing Networks vs. Mainframes," Mini-Micro Systems, Oct. 1980, pp. 121–140.

(List continued on next page.)

Primary Examiner—Lawrence E. Anderson
Attorney, Agent, or Firm—Glenn W. Bowen; Mark T. Starr

[57] ABSTRACT

A record lock processor provides a common facility for control of the locking and unlocking of mass storage objects (for example, records, files, pages or any other logical entity) that is shared by a number of loosely-coupled data processors. The terms "record" or "records" wherever they are used in this document are intended to refer to all such objects, including records, files, pages or any other logical grouping or entity into which the mass storage may be portioned. Each of the data processors has access to all of the shared mass storage. Three Lock Modules all receive the same requests and majority voting techniques are used to determine the result. A fourth lock module is included as a Hot Spare Module. A Maintenance Module receives the same requests as the voting Lock Modules and, therefore, it is able to interpret results on-line based on user requests. Programmable Channel Interfaces provide the operational interface to the host processors. The Lock Modules are also programmable, and they hold lock and Queued Lock Requests and execute locking and unlocking algorithms in response thereto.

4 Claims, 4 Drawing Sheets

OTHER PUBLICATIONS

*IBM Tech Disclosure Bulletin* vol. 23, No. 4 (Sep. 1980), "Recovery For Transient Faults in Redundant Systems" by J. E. Smith pp. 1707-1709.

Proceeding of the IEEE, vol. 4, No. 6 (Jun. 1976) "Microcomputer Reliability Improvement Using Triple-Modular Redundancy" by Wakely, pp. 889-895.

Conrad, Marvin and Hopkins, William D., "Distributed functions build modern computer systems," Electronic Design, Sep. 3, 1981, pp. 142-147.

Loques, O. G. and Kramer, J., "Flixible fault tolerance for distributed computer systems," IEE Proceedings, vol. 133, Pt. E, No. 6, Nov. 1986, pp. 319-332.

Beier, H. A., Murray, T. E., Strickland, J. P. and Watts, V. L., "IMS/VS Data Sharing Enhancements (Dynamic Reconfiguration to Initial State)", IBM Technical Disclosure Bulletin, vol. 27, No. 1A, Jun. 1984, pp. 338-342.

RECORD LOCK PROCESSING FOR MULTIPROCESSING DATA SYSTEM WITH MAJORITY VOTING

This application is a continuation, of application Ser. No. 07/669,788, filed Mar. 15, 1991 now abandoned, which is a continuation of application Ser. No. 07/167,748 filed Mar. 14, 1988, now abandoned.

BACKGROUND OF THE INVENTION

1. Field of the Invention

The present invention is directed to multiprocessing data systems in which there is a coordinated usage of a shared mass storage among a plurality of data processors. In particular, the present invention is related to a Record Lock Processor (RLP) which is a special processor that facilitates the coordinated use of the shared mass storage in a high transaction environment, such as for example, in an airline's reservation system.

2. General Discussion of Background Information

The present invention involves a loosely coupled configuration with the Record Lock Processor wherein queuing and contention for common resources is moved to the mass storage record shared among multiple hosts and each data processing device has its own operating system. In tightly coupled systems (i.e., multiple processors that share main memory) there is queuing for internal memory references in addition to queuing for use of a mass storage record. In transaction applications for larger numbers of processors sharing one memory, the efficiency of the loosely coupled system using the Record Lock Processor is better than the efficiency of a corresponding tightly coupled configuration.

The efficiency of the loosely coupled system of the invention is approximately constant as more nodes (systems) are added to the network. The efficiency of tightly coupled systems decreases with each additional data processor. This means that each successive processor added yields less the net additional system throughput than the previous data processor that was added.

In addition, in the present invention deadlock detection can be performed on all the locks. Deadlock is when process A is waiting for a resource held by process B and process B is waiting for a resource held by process A. It is not possible to do deadlock detection when locks are held in multiple places without some additional form of communication between the storage locations for the lock entries. By putting the locking facility in one location, specialized control units with locking capabilities for each new generation of disk subsystems are avoided. There is, therefore, a savings in design resources since the standard mass storage control units can be used in other applications.

Use of a Record Lock Processor allows the customer to apply additional computing power to one application/data base using standard processing systems. The Record Lock Processor is designed to handle four data processors which will yield 3.2 to 3.6 times as much compute power as that of one data processor (assuming that all data processors are the same size). The Record Lock Processor concept is easily expanded to N systems by using more channel connections or using local area networks.

In a one node system if the node goes down, computing power is not available. In a loosely coupled network, if one node goes down, processing can continue on the other nodes. In most hot standby systems the standby node is not processing on the same application as the primary node. In the Loosely Coupled System of this invention with the Record Lock Processor, both nodes can work on the same application/data base at the same time. The reason this is true is the coupling efficiency of the Record Lock Processor approach is superior to other software methods of interhost conflict resolution.

A Loosely Coupled System configuration using a Record Lock Processor also provides for incremental growth of the system. A customer can add on another system to the network to add more compute power instead of replacing the system already in place. The Record Lock Processor approach adds an additional dimension to growing systems by adding more systems to the existing equipment. The addition of a system to a Loosely Coupled System is less disruptive to the existing computer system because the Loosely Coupled System does not have to connect to the in-place main memory.

The utilization of a plurality of data acquisition devices, in conjunction with a supervisor module which passed the outputs of each data acquisition function device to an arbitrator has been proposed for function-to-function architecture, as shown in Electronic Design, Sep. 3, 1981, pages 143-156. In this arrangement, if the votes of each module, concur execution proceeds; but if not, disagreeable modules can be purged from the system by one of the two arbiters. Function-to-function architecture (FFA) is a standardization of rules such that one actor can request that functions be performed by other actors. An actor is defined in the Electronic Design article as an entity that provides for and controls the execution of one or more functions. A function is defined as a transformation on a set of input parameters that use the set of output parameters.

Numerous processing devices have been designed for coordination of a number of data processing mainframe units with one or more units of shared mass storage. In a high transaction environment locking demands and reliability demands make many prior systems completely unsuitable for the intended task. With the system of the present invention, locking capabilities are over 15,000 lock requests per second, with a holding capacity of over 100,000 locks at a single time and a queuing capacity of over 1,000 locks at a single time, plus the capability of operating with up to four large scale mainframe computers, such as the Unisys®1100/90 computer, or multiprocessing systems such as the Unisys®1100/92 computer, which utilizes two Unisys®1100 processors.

The present invention utilizes the triple modular redundancy concept with a Hot Spare Module in a Loosely Coupled System, high transaction environment, such as airline reservations. In addition, there are eight Programmable Channel Interfaces. The three active Lock Modules all receive the same input, and the resulting outputs from the lock modules are fed to the voter interface units. A comparison of the results are made so that if one of the units disagrees, this is considered to be a failure, and a Hot Spare Module which receives the same data as the active units and continually acts on this data in the same manner as the active data, but does not vote, may be switched in. Thus the "hot" spare ready for immediate activation is switched in, and the failed unit is switched out.

A separate Maintenance Module performs analysis and maintenance on the failed unit. The maintenance module operates on the failed module and attempts to take corrective action while the failed module is receiving the same information as the active units. When the failed, or standby, module is repaired its status can then be upgraded so that it then acts as the Hot Spare Module.

SUMMARY OF THE INVENTION

In a loosely coupled record processing system with a Record Lock Processor the control of shared mass storage by two or more mainframe computing processing systems is provided by utilizing a record lock processing system which has a plurality of Lock Modules. All of the Lock Modules operate on the same input information, and they all provide an output to the voter interface units. A Hot Spare Module is provided to be switched in place of any failed unit when the arbitrators decide that the votes of one unit differ from the votes of the other two. Each of the Lock Modules includes a Lock List Memory, a Queue List Memory for listing delayed lock requests. The system also consists of at least one Programmable Channel Interface for each of the data processing systems which are connected to the Record Lock Processor, and preferably a programmable two-channel interface. The combination of the programming of the Lock Modules and the Programmable Channel Interface operation provides the locking function with a high degree of reliability and high transaction speed along with a large queued Lock List storage capacity which allows queuing of 1000 locks, or more, at any time is also preferably provided.

BRIEF DESCRIPTION OF THE DRAWINGS

The present invention is described by reference to the drawings in which.

DETAILED DESCRIPTION OF THE PREFERRED EMBODIMENT

Figure 3:
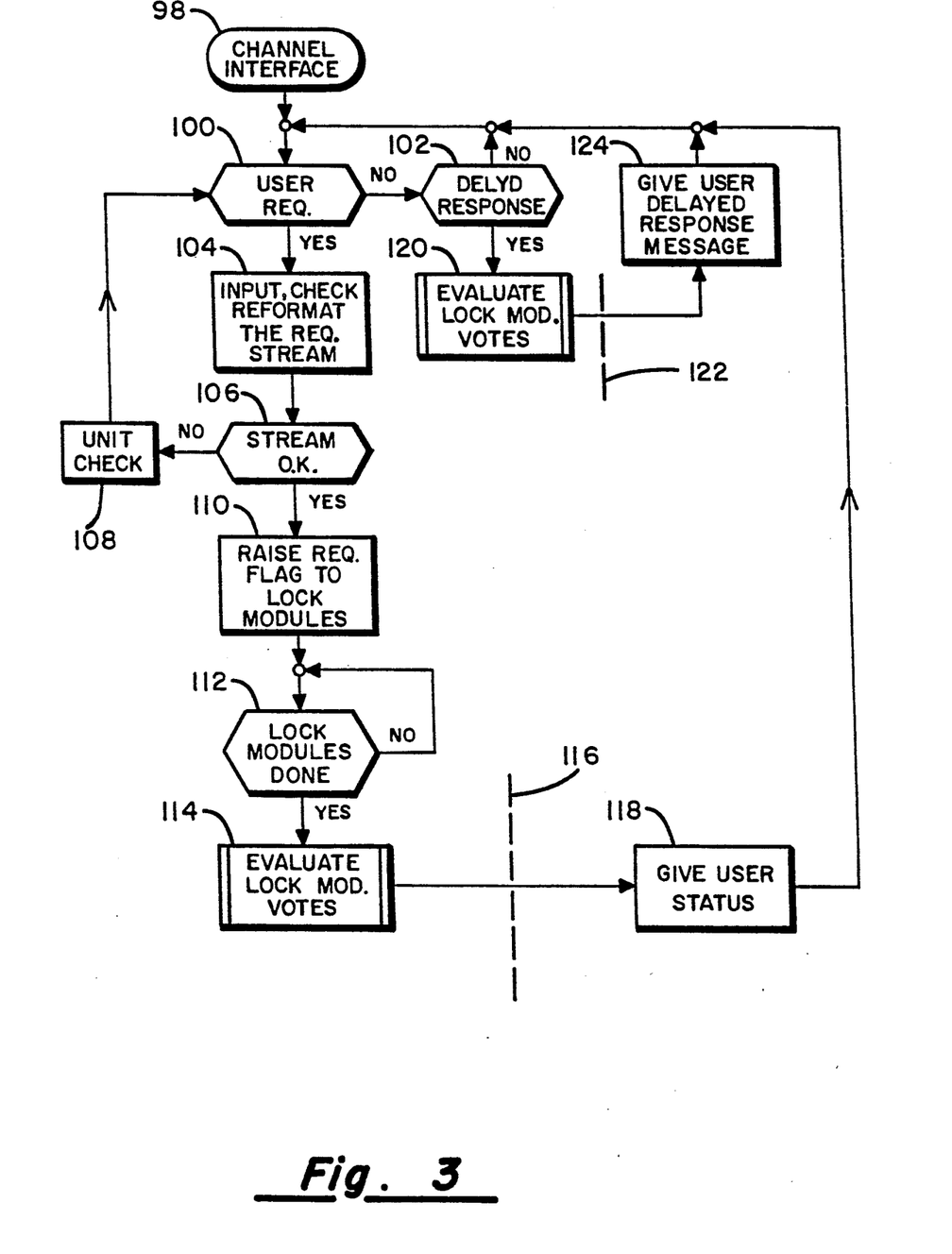
FIG. 3 is a flowchart of the operation of the Programmable Channel Interface.

The combination of a Programmable Channel Interface programmed in the manner described and a Record Lock Processor is important to the functioning of the present invention. Referring to FIG. 3, there is shown a flow diagram for the operation of the Programmable Channel Interfaces. The hardware of the Programmable Channel Interfaces may consist of of a bit slice microprocessor, connections to a block multiplexer I/O unit channel and two buffer memories for communicating with the Lock Modules. The control algorithms for the Programmable Channel Interface are preferably stored in microcode. The principal task of the Programmable Channel Interface as shown in the flow chart include the (1) accepting the request streams from the channel, (2) checking, formatting and placing the request streams in the required buffer where it is available to the Lock Module, and (3) evaluating the votes of the Lock Module and presenting the status or delayed response messages to the channel.

As seen in the flow diagram, a check is made at the station 100 to determine if a user request stream is present. If it is not present delayed response is called for as indicated by station 102. In the event of a delayed response, the unit recycles upon itself until the delayed response is completed. If the user request stream is present, it is received as an input and it is checked against the standard acceptable format, as indicated at station 104. If the stream is not located in station 106, then the combination accomplishes a unit check at the station 108 and recycling occurs until the stream is located. Once the stream has been validated, the program moves to station 110 where a flag is raised indicating that a record is present. As indicated at station 112, since all of the Lock Modules are operating on the same input, they must all be finished with an operation that requires this input before moving on to the evaluation of the Lock Module votes in step 114. It is at the stage following the evaluation of the Lock Modules that determination must be made, as indicated by the dotted line 116, whether or not the Hot Spare Module is to be substituted for one of the operating units. Subsequent to this the user is given the status of the channel at stage 118.

Returning to the station 102, the operation of the Programmable Channel Interface in the event a delayed response is required, as, for example, when the requested lock list for particular records are queued into the queue list memory will now be described. Upon the completion of the required delayed response, the Lock Modules are evaluated as indicated in step 120. Again, as indicated by the dotted line 122, a determination is made as to whether or not any of the modules have failed, and in the step 124, the user is sent a delayed response message. In Lock Module voting the votes consist of status or message bytes and tokens which are written in the response buffer by the Lock Modules as they work their way through the request streams in parallel. A "token" in turn consists of a memory address or content within the Lock Module which is indicative of the decision path followed by a particular module. The Programmable Channel Interface has the same cycle time as the Lock Module microprocessor, which increases the throughput while at the same time producing the advantages of a microprogramming. In this type of architecture, the Lock Modules can be viewed as being serviced by the Programmable Channel Interface. It is seen by the preceding that the initiation of the Lock Modules is accomplished in conjunction with the programming of the Programmable Channel Interface unit, and not with the Lock Module, thereby freeing up the Lock Module so that it may perform its essential task of acquiring queuing and releasing locks more effectively.

Figure 4:
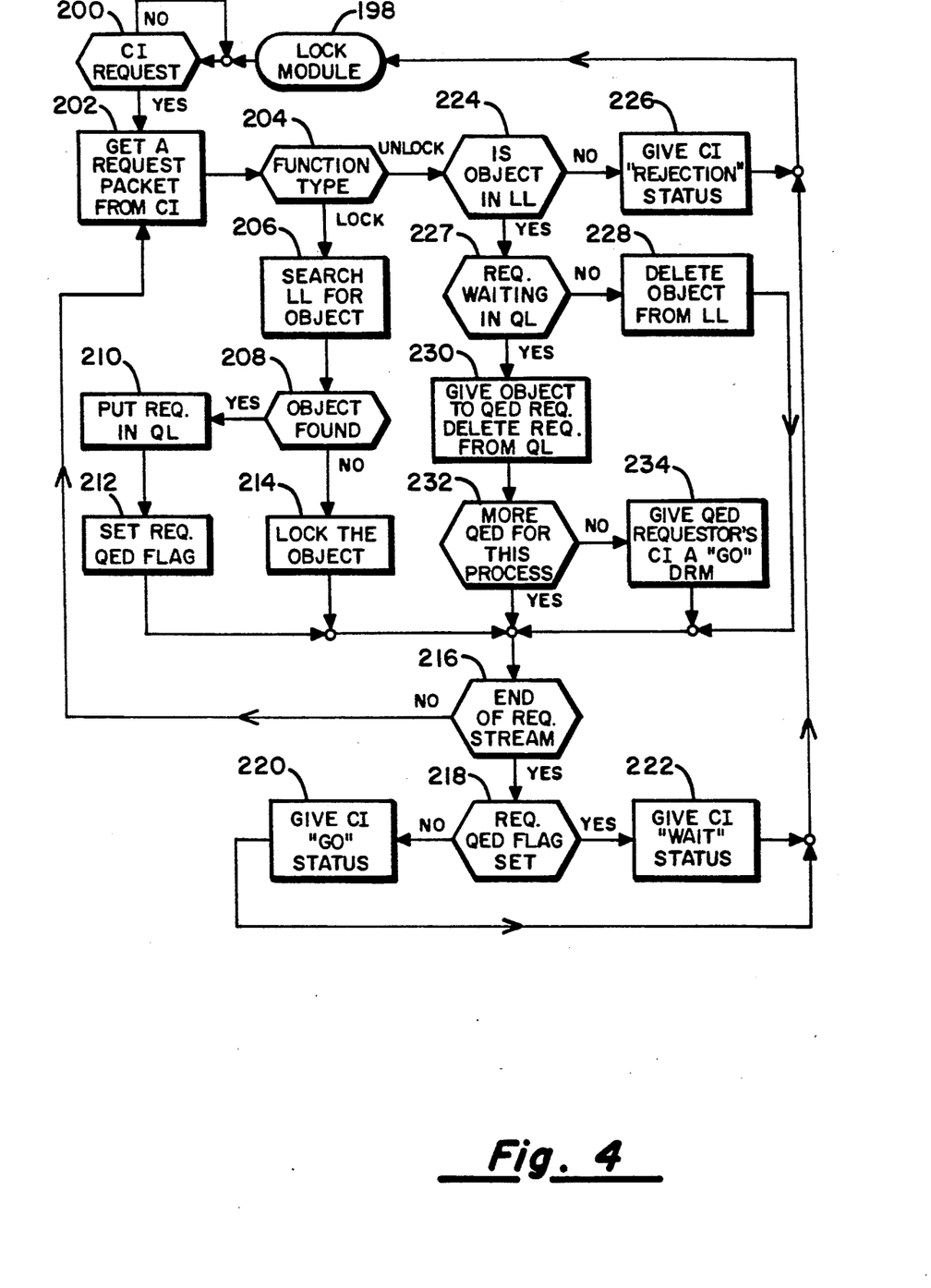
FIG. 4 is a flowchart of the operation of the programmable Record Lock Processor.

With reference to FIG. 4, it is seen that the initiation of the Lock Module process of step 198 proceeds to step 200 which checks to see if any incoming data is a Channel Interface Request. If it is not the step recycles upon itself until a Channel Interface Request request arrives. Once the Channel Interface Request arrives, a request packet is obtained from the Programmable Channel Interfaces as seen in step 204. Following the receipt of the request packet, a test is performed at step 204 to determine whether the function involved is a function that requires locking or unlocking. If the function is a lock function, the Lock List Memory in step 206 is searched to determine if the object is present in the Lock List. In the event the object is found in step 208, the request is put in the queued lock for this memory. In step 210 and step 212, a Request Queued Flag is set. Thus, the record lock request is put into the Queued List Memory since it already was present in the Lock List Memory. In the event that step 208 found that the request was not present in the Lock List, the lock of the record is immediately performed in step 214.

Regardless of whether the request is put in a Queued List and the Set Request Queued Flag was set in step 212, or the object was locked in step 214, the process then moves to 216 to determine of the end of the request stream has been reached. If the answer is "no" the system recycles back to the request package step from the Programmable Channel Interface 202. On the other hand, if the end of the request stream did occur, the Request Queued Flag step is tested in step 218. If the queued flag is not set then the Programmable Channel Interface can be immediately given a "go" signal as shown in step 220. On the other hand, if the queued flag was set then the Programmable Channel Interface is given a "wait" status in step 222.

Turning to step 204, if a function type is an unlocking function, the first decision is whether or not the object is in the Lock List as indicated in step 224. If the object is not in that Lock List, the Programmable Channel Interface outputs a rejection status signal, as indicated in step 227. If the object is in the Lock List, a check is made to determine if the request is waiting in the Queued Lock List in step 226. If the object is not waiting in the Queued Lock List, it is deleted from the Lock List in step 228, and following this step 216 is taken where the end of request stream test occurs. In the event that the Queued Lock List has indicated that there was a waiting request, the object is given to a queuing register and deleted from the Queued Lock List in step 230. The test is performed in step 232 then to indicate whether there are more requests which are queued for this process. If the answer is "no" in step 234, the queued requestor channel interface is given a "go". In the event there are more queued requests, the process goes again to step 216.

It is noted from the foregoing that each time there is a user request, Lock Module voting occurs in the Programmable Channel Interface. Thus, the channel request is able to verify that all of the lock engines are operating satisfactorily, and that a replacement unit be added. Prior to the time that a Lock or Unlock Request signal is supplied to the Lock Module, the Lock Module may continue to process the requested Lock or Unlock Request, regardless of whether or not they previously have been received and supplied to the Queued Memory List or not. Thus, the incoming requests from the user are checked by the Programmable Channel Interface through the majority voting process, and the initiation of the Channel Request to the mass storage unit from each of the using processors is given a "go" or "wait" or a "rejected" status signal under the control of the Lock Module as to whether or not a valid request is immediately received from the Programmable Channel Interface, or whether a request is already in the queued register that is to be operated on; or in the case of unlocking whether the object is ready for unlocking from the queued register; or in the case of a rejection when an object is not found in the Lock List.

A Loosely Coupled System is a network of large scale mainframe computers, such as the Unisys ®1100 computer series systems, all of which work together on a common data base. The objective of a Loosely Coupled System is to provide the power of two up to the power of four standard computer systems and to provide increased compute power availability. Ideal applications for loosely coupled systems are found in the transaction environment. The Record Lock Processor is a new hardware facility for Loosely Coupled Systems which handles record locking for all of the systems in the network.

Hardware

When using the Record Lock Processor, each reference to shared mass storage which requires a lock, initiates a request of the Record Lock Processor prior to making a request to the shared mass storage. The Record Lock Processor handles the request and gives the requestor one of three status messages:

Granted—OK to proceed.

Lock not granted, lock queued waiting release of conflicting lock

Error (abnormal case)

In the case of a queued lock a delayed message will be sent to the requestor when the lock is granted without any further action on the part of the requesting host. After the lock has been granted the host performs the operations on mass storage and then the host releases the lock. The release of the lock makes that record available to any requestor to use.

The Lock Request is intended to describe a record. However, the Lock Entry is a logical entity of which software can choose the meaning. That is, the lock may represent a name to the software.

Special consideration is given to unlocking. The typical method to release a lock is to issue a gang unlock command which will release all the locks for a process (i.e., transaction). The gang unlock command is called unlock process. The unlock process command is issued when the transaction is complete. With one command all the locks can be released for a process saving potentially many I/O commands.

A second type of unlock command is to unlock a record or a file. This is an individual unlock which simply unlocks the specified object. A third unlock command is called Unlock Application Group/Host. Unlock Sub-Collection is used in cases where, for example, a host is down and it is desired to release all the locks for the downed host.

Deadlock Detection

The Record Lock Processor handles deadlock detection. Since all the locks are held in one place instead of being spread across multiple hardware devices, it is possible to detect the presence of a deadlock. An example of a deadlock is a case where one process is waiting on a facility held by a second process and the second process is waiting on a facility held by the first process. Both processes are waiting and neither will release the facility needed by the other until the process completes its work. Deadlocks can cause resources to be reserved while waiting for other resources during which time no work is done by the deadlocked processes. The deadlocks also inhibit other processes from using the locked resources. The consequence of a deadlock is to slow down the processing in the network.

To handle the deadlock case the Lock Module starts a timer when a request is internally queued. (If the request was granted there is no conflict. Therefore, we need only to concern ourselves with lock requests waiting on the queue.) If the timer on the lock request in the queue expires this means that a reasonable time has elapsed and the Lock Module will start the deadlock detection process. If there is deadlock, the condition is reported to the offending requestor. If there is no deadlock the timer is reset. The timer approach is used because deadlocks are a very infrequent occurrence but require a nontrivial amount of time to detect. Deadlocks, if undetected, can be devastating in terms of throughput when they do occur. A second deadlock option on each lock entry is provided called presumed deadlock. If the request cannot be granted immediately, the request is rejected.

Commit Sequence Number

The Record Lock Processor has a command to request a commit sequence number. The commit sequence number is based on a counter. The number is guaranteed to be unique and increasing. The commit sequence number is used to put on audit trails for recovery purposes.

Record Lock Processor Capabilities

The Record Lock Processor of the preferred embodiment can handle twice the rate expected from four Unisys®1100/94 computers. There are eight FIPS 60-2 Block Multiplexer channel interfaces on the Record Lock Processor. The eight Programmable Channel Interfaces are planned to provide two connections to each of four systems. Additionally, there is a Maintenance Channel which is used for diagnostics. The Maintenance Channel is not used for normal operation.

Redundant Attributes of the Record Lock Processor

The Record Lock Processor is configured as a triplex entity plus a Hot Spare Module is included in the cabinet. The triplex configuration provides for backup, insures integrity, and resolves conflicts when there is disagreement among the identical Lock Modules.

All four Lock Modules do the same task in parallel. The Lock Modules are all the same. The three active Lock Modules participate in a vote on the answer before the answer is sent back to the requester. In case there is disagreement among the Lock Modules, the response from the two agreeing Lock Modules is selected to be the correct answer. When there is disagreement, the dissenting Lock Module is switched out automatically and the spare is brought in for the next operation. The spare has a current copy of the locks so it is ready to use.

The voting logic is duplicated in each of the channel interfaces and there does not become a single point of failure. The channel interfaces all operate in parallel. A lock command is received over the I/O channel by the Programmable Channel Interface. The entire command is checked for validity. Only after the entire request has been queued in the channel and validity checked does the channel interface bid for use of the Lock Modules. This scheme allows for parallelism on the I/O operations and maximum utilization of the Lock Modules. This approach avoids having the lock module connected onto the channel while the data is being transferred and the request is being checked. The overall performance of the Record Lock Processor is increased due to the overlap of requests on eight Programmable Channel Interfaces.

Internal to the Record Lock Processor there is separate power and cooling for each Lock Module and each group of four channels. There are two A.C. entrances for connections to two power sources. The design allows for any module to be removed from the cabinet while the rest of the cabinet is running. The Record Lock Processor will continue to operate if either of the A.C. sources is present. Uninterruptable power, if desired, must be supplied externally.

If one of the Lock Modules fails there is a hot spare. If a second Lock Module fails before the first is returned to service, the two remaining Lock Modules can reliably handle the full load. If the third Lock Module fails before the first and second are returned to service, the Record Lock Processor will continue to operate with one Lock Module. If a channel module fails the remaining Programmable Channel Interface will still be operational and will handle the load of a mainframe computer system without degradation. If a whole group of Programmable Channel Interfaces fails the other group of Channel Interfaces can handle the load. The Record Lock Processor is tolerant to at least one failure and in several cases multiple failures.

Loosely Coupled Systems Capacity and Availability

Loosely Coupled Systems provide a means to grow large networks of standard systems which can all work on the same data base. This capability provides an improvement in system capacity and availability. The network of Loosely Coupled Systems can expand the total compute power 3.2 to 3.6 times the power of one node.

If one node fails, compute power is still available on one or more of the remaining nodes. Locks held by a down host remain locked until the down host is recovered. Locks that are held by a down host are avoided by other hosts. Special steps are taken to condition the Record Lock Processor to reject requests for locks held by the down host. This means that the alive hosts can continue processing on other transactions while the down host is being recovered.

The Loosely Coupled configuration provides increased availability over a single node because in a single node the whole complex is down until the host is recovered. In the Loosely Coupled System the "live" nodes can continue processing while the "down" node is recovering.

Configuration Sizing

The user of the system of the present invention can choose configure excess capacity such that if one node is down, there is still sufficient compute power available to handle the work load. The user can also choose to configure the system to handle the maximum load only when all components are operational. This second approach would yield reduced capacity when one node is down. The flexibility is available to choose the configuration to match specific user requirements.

Incremental Growth

Loosely Coupled Systems provide for incremental growth. When more capacity is needed a new system (node) can be added and can be tested without seriously disrupting the remainder of the system. The connections must be made to the shared peripherals and the Record Lock Processor, but the in-place systems do not have to be disturbed.

The Loosely Coupled System's configuration allows the customer to configure the maximum compute power on an application during peak load times and then assign some portion of the configuration to other tasks during off peak periods. The benefit is that the customer can have the backup compute power available when it is needed, but also use the "spare" compute power for other applications during non critical periods.

Performance

With the Record Lock Processor of the present invention, the power of four Unisys ®1100/94 processors is forecast to provide 3.2 to 3.6 times the computing power of one Unisys ®1100/94 processor in a high transaction environment application. This is based on a 20% to 10% overhead respectively. The assumptions are that there are no application or data base bottlenecks which would inhibit the use of the computer power available in the Loosely Coupled System's network and the same processor utilization is considered in both cases. applications will vary. The expectation is that the overhead will be 20% or less.

The Loosely Coupled Systems Network is a solution to providing increased capacity and availability of this invention to transactions processing environments. The new hardware required to coordinate the use of shared data is called the Record Lock Processor.

Section A—Overview of the System

The Record Lock Processor (RLP) of the present invention is a special-purpose processor that facilitates the coordinated use of shared mass storage among two to four independent data processing systems in the described preferred embodiment. It is used in conjunction with shared mass storage to provide and control the concurrent access from multiple host to a common shared group of database files. The RFP is thus a centralized mechanism for the synchronization of file access, and it is also capable of deadlock detection. The described embodiment is particularly adapted for use, such as airline reservation systems.

The principal features of the RLP in this environment are:

(1) it may have the capability of storing up to over 100,000 locks at a time;

(2) it may have the capability of handling over 15,000 lock requests per second from all channels;

(3) it may employ majority voting techniques to determine the result of each request operation;

(4) it may use three Lock Modules and a fourth Lock Module as a "hot" standby, or spare unit;

(5) it may provide deadlock on mass storage lock request; and (6) it may provide a Maintenance Channel that is separate from the operational channels, but which checks the operation of a failed unit on a line using the same user request and data that are processed by the remaining active Lock Modules.

When four Lock Modules are employed eight Programmable Channel Interfaces are utilized. The Programmable Channel Interfaces provide the operational interface to the host system. The Lock Modules hold the locks and queued request and execute the locking an unlocking algorithms. The maintenance module monitors the general condition of the RLP and performs necessary testing and maintenance functions through a separate channel interface to a host system which is independent of the normal operational channels so that the Maintenance Module I/O TRAFFIC does not interfere with normal operation.

Lock Module

The Lock Module (LM) executes the locking and unlocking operations in the RLP. Each LM in the described embodiment contains a 4M byte lock memory preferably with error correction capability. The Lock memory (LM) stores lock entries and queued lock requests. The LM hardware consists of three functional parts:

(1) the Lock Memory—this memory holds the lock entries and queued lock requests;

(2) a microcoded control section—this section executes the lock/unlock and deadlock detection algorithms. In the preferred embodiment this is an Am 29014 byte bipolar microprocessor slice which is manufactured by Advanced Micro Devices; and (3) interfaces to the Programmable Channel Interface (CI) and the Maintenance Module (MM). This hardware connects to eight Programmable Channel Interfaces and the Maintenance Module.

Channel Module

A Channel Module (CM) consists of four, independent Programmable Channel Interfaces. Each Programmable Channel Interface (CI) provides the capability of communicating with a host computer system. It is used for transferring all operational requests from that host to the RLP and for transmitting responses back to the same host. Each CI exercises majority voting on all LM decisions and acts accordingly. The CI hardware consists of three functional parts:

(1) a set of mailbox memories—these memories provide a means of communication with all four LMs;

(2) a block multiplex interface—this interface provides the path of communication to the host system;

(3) a microcoded control section—this section executes the Channel Interface algorithms. It is based on a 166-bit wide 2901 microprocessor. The CI is designed for attachment to, and interaction with, a Block Multiplexer that supplies channels to the host system, and it responds to multiple subsystem addresses.

Maintenance Module

The Maintenance Module (MM) in the RLP is a facility which is dedicated to the maintenance and testing of the RLP and to down-loading microcode to the LMs and CIs. It includes scan-set interfaces for LM and CI modules, a maintenance panel, a Block Multiplexer, Channel Interface and a "test well"[for CI board sets. The MM has two modes of operation:

(1) From the I/O Channel This mode is employed for maintenance operation on the balance of the RLP. This requires MM to be functionally sound. In this mode, test microcode may be down-loaded from the I/O channel and executed on command. Test results are reported via an input/output (I/O) channel. This mode also provides full scan set capability for LM and CI modules in the maintenance mode and provides a limited scan-monitor-request capability for these modules in normal operation.

(2) From the Maintenance Panel This mode is primarily for maintaining the MM itself, and it is employed only when the MM cannot communicate with the I/O channel.

Description of the Block Representation of the System

Figure 1:
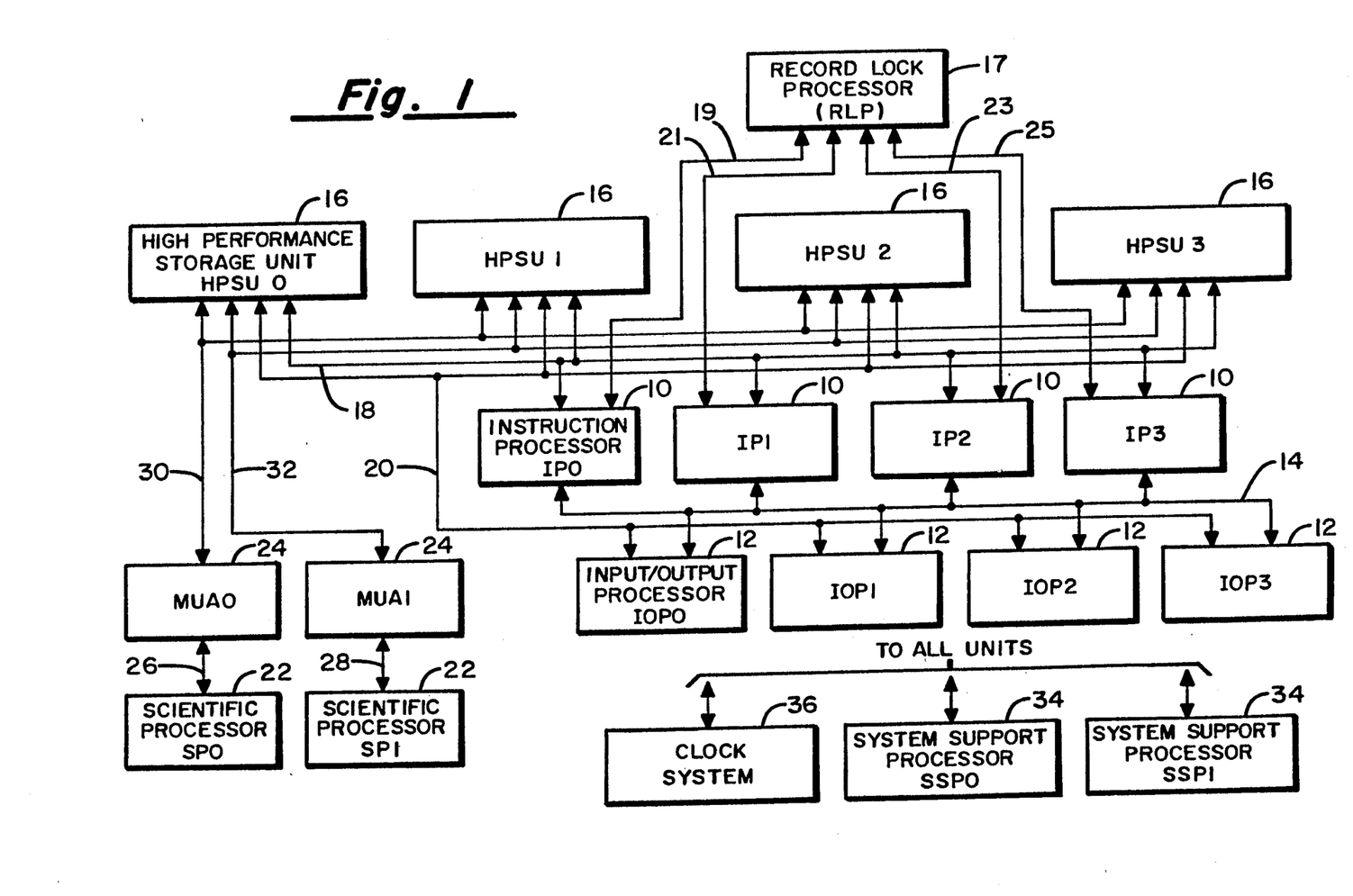
FIG. 1 is an overall block design of a loosely-coupled multiprocessor data processing system which utilizes the Record Lock Processor of the present invention.

FIG. 1 is a system block diagram of the over-all digital data processing system in which the invention can be utilized. The over-all system is essentially modular, and provides for parallel processing and is based on the system described in U.S. Pat. No. 4,649,475 issued Mar. 10, 1987 in the name of James H. Scheuneman, and owned by the assignee of the present invention.

For the configuration illustrated, from one to four Instruction Processors IP0 through IP3, each labelled 10, can be utilized. Each IP can, for example, be a Type 3054-00 unit available from Unisys Corporation, or such other instruction processor (IP) available commercially as would be compatible. The IP provides basic mode and extended mode instruction execution, virtual machine capability, and contains two buffer memories (not shown), one an operand buffer, and the other an instruction buffer. Each IP is functional to call instructions from memory, execute the instructions, and in general does data manipulation. The IP also executes instructions to set up input and output data buffers and channel access control.

In conjunction with the IPs, from one to four Input-/Output Processors IOP0 through IOP3, labelled 12, can be utilized. The interconnections between the IPs and the IOPs, collectively labelled 14, are, in fact, direct connections between each unit, and the interconnection is not bused. Each IOP can be a type 3067-00 unit available from Unisys Corporation, or an equivalent type of processor. The IOPs handle all communications between the IPs, and the memory systems, and the peripheral subsystems (not shown). In this type of configuration, the IPs function as the Sys-Central processing Units, and the IOPs act as CPUs to handle all of the communications. The IPs and IOPs are commonly referred to as the 1100/90 system.

From one to four High Performance Storage Units HPSU0 through HPSU3, each labelled 16, can be utilized in the system. Each HPSU is a free-standing unit with eight memory Banks, each Bank containing 524K words. Each HPSU provides four Instruction Processor (IP) ports for providing communication paths to the IPs, both for reading and writing, shown collectively as interconnection paths 18. Again, it should be understood that interconnection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SP) port, and in the embodiment shown has two such SP ports. Each SP port has a four-word data interface. The IOP and IP interfaces operate on a 60 nanosecond clock cycle and the SP interface operates on a 30 nanosecond clock cycle. The HPSU is a novel memory system and is described in one or more of the above-identified copending incorporated patent applications.

Error Correction Code (ECC) is used internal to each HPSU to provide single-bit error correction and double-bit error detection.

In the embodiment illustrated one or two Scientific Processors S00 and SP1, labelled 22, can be utilized. If a single SP is used with a single HPSU, it may be coupled directly to the SP port of such HPSU. When two or more HPSUs are used with an SP, it is necessary to provide a Multiple Unit Adapter (MUA) for each SP. In this configuration MUA0 and MUA1, each labelled 24, are coupled to SP0 and SP1, respectively, across interface lines 26 and 28. MUA0 is coupled to each HPSU through interconnection paths 30, and MUA1 is coupled to each HPSU although interconnection path 32.

Each SP functions under direction of one or more of the IPs to perform scientific type calculations in a support mode. In this regard, the IPs can be considered to be host processors and the SPs can be considered to be support processors, all operating through common storage.

The overall system maintenance and supervision is accomplished through one or two System Support Processors SSP0 and SSP1, each labelled 34, which are connected to all units of the system. The SSP is available commercially and is utilized in the Unisys Corporation 1100/90 Systems. In general, it is understood that each SSP performs the function of a hardware maintenance panel for the system. The display and setting of information, the activation of most maintenance facilities, selecting modes of operation and the like, is done at the control section of the SSP.

A clock System 36 is utilized to maintain synchronous operation of the entire system. Clock and synchronizing signals are sent to each IP as well as each HPSU, each IOP, and each SP. The clock interface includes signals and commands from the IP for controlling clock rates, clock mode, cycle count, and other capabilities of the clock.

Figure 2:
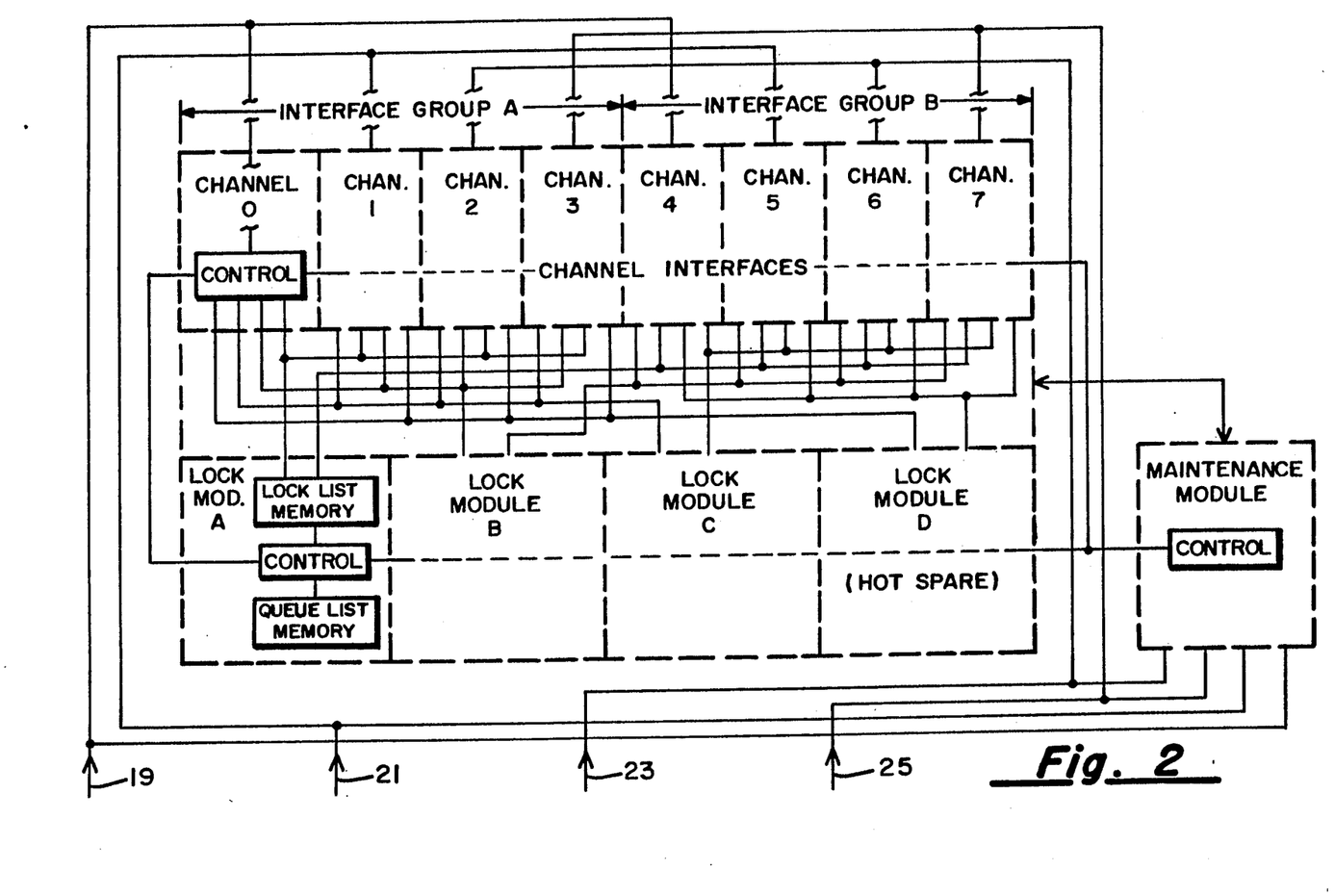
FIG. 2 is a detailed block diagram of the Record Lock Processor which is shown as a single block in FIG. 1.

The Record Lock Processor (RLP) 17 is coupled to the IP's by the lines 19, 21, 23 and 25, (as shown in FIGS. 1 and 2), and functions as an on-line peripheral device to manage record, block and file locks for all shared mass storage attached to a multi-host-Series Loosely Coupled System data processing system. it performs Write, Read and Sense commands to accept control packets and messages from the connected hosts and to send data packets, messages and status to the connected hosts. It also performs locking sub commands like Lock, Unlock, Forward Message, etc., to manage locks and messages and to perform the other functions of the RLP.

The RLP is controlled by packets containing process, record, block, file parameters such as Subcollection number, process number, and Object Name to identify the controlling entity and the target object. Control packets and messages can be sent individually or in streams.

As shown in FIG. 2 the RLP is composed of Lock Modules (LMs), Channel Modules (CMs) and a Maintenance Module (MM). The primary functional unit is the LM, which processes the locking functions. The CM performs all of the I/O functions and processes the votes received from the LMs on each locking function. The MM monitors the general health of the RLP and performs required test and maintenance functions.

Full functionality of the RLP is provided by the combination of one Lock Module and one Channel Interface. The multiple units provide redundancy to accommodate the failure of hardware components.

The memories of a Lock Module which has been powered down or out-of-service must be charged with a copy of the memory content of an on-line active Lock Module. The Maintenance Module checks the state of lock modules. A Lock Module which has been taken off line because it dissented on a vote is detected as an off-line unit by the Maintenance Module. A signal is sent to the host via the Maintenance Module to request that diagnostic tests be down line loaded and executed. The micro diagnostics are down line loaded into the subject Lock Module via the Maintenance Module. The operational microcode is also down line loaded into a Lock Module.

A Lock Request signal is sent via Maintenance Module to the subject Lock Module to start up. Upon receipt of the "start up" signal, the subject Lock Module selects an on-line Lock Module to request a charge up. The subject Lock Module controls the writing of all the Lock List, the Queued Lock List, and other necessary control information from one of the operating Lock Modules into the subject Lock Module. While the copy operation is in process, operation on the Lock Request is suspended. The duration of the suspension is approximately two seconds maximum in the described embodiment.

When the copy operation (charge up) is complete, the off-line Lock Module is normally placed in standby condition. In this condition it is the hot spare Lock Module. The subject Lock Module can alternately be placed in reserve standby if the maintenance tests indicate that the integrity of the recently tested Lock Module is questionable. In reserve standby the Lock Module cannot be switched in as an active voting member, however, other operations continue the same, that is, the subject Lock Module operates on the same data as the active Lock Modules and may be subject to further testing by the Maintenance Module.

Lock Module Description

The Lock Module (LM) executes the locking and unlocking operations in the RLP. Only lock module A is shown in detail since the other lock modules B, C and D are identical to lock module A. It consists of twelve Printed Circuit Arrays (PCAs) containing the functional logic and memory. Each LM contains 4 Mbytes of memory with Error-Correcting Code (ECC) for Lock Entries and Queues Entries, 96 Kbytes of microcode memory and 16 Kbytes of local memory. The LM hardware consists of three functional parts:

(1) The Lock Memory—this memory holds the lock entries and Queued Lock Requests;

(2) A microcoded control section—this section executes the Lock/Unlock and deadlock detection algorithms. It is based on a 32-bit wide Am 2901 microprocessor; and (3) Interfaces to the LMs, the CIs and the MM--this hardware connects to the other three Lock Modules, eight Programmable Channel Interfaces and the Maintenance Module.

Conceptually, however, the LM has four functional parts, two of them deriving from the same hardware entity (the Lock Memory):

(1) A Lock List—this is the portion of the Lock Memory that is used to hold lock entries. Each entry consists of a record identifier, the name of the lock owner and certain other information;

(2) A Lock Queue—this is the portion of the Lock Memory that is used to hold lock requests that are waiting to set locks on objects which are already in the Lock List, having been previously locked by some other Process. Whenever an object is unlocked (i.e., its entry is removed from the Lock List), the Queue List is scanned for requests waiting to lock the unlocked object;

(3) The Microcoded Control Section that was described above; and (4) Interfaces to the LMs, the CIs and the MM that were described above.

Lock Memory Address Register (LMAR)

A 20 bit LMAR in each LM preferably holds the current Lock Memory address. This size allows for addressing up to 2M words. LMAR is a write only register and changing the content of LMAR while a Lock Memory read or write is in process will result in corruption of the memory content. For this reason the entry of LMAR is interlocked with the Lock Memory timing such that the LM clock is stopped if LMAR is entered at an improper time. LMAR may be entered by the same microinstruction which initiates a Lock Memory operation.

Circular priority selection of Lock Request Buffer Available (LRB AV) signals from each of the CIs may be implemented with known priority techniques. When a LRB AV is honored, that LRB AV will not be honored again until all the other CIs have been serviced.

The Channel Module (CM) consists of four, independent CIs. Each Channel Interface (CI) provides the capability to communicate with a host system. It is used for transferring all operational requests from that host to the RLP and for transmitting responses back to he same host. Each CI exercises majority voting on all LM decisions and acts accordingly. Each CI in the preferred embodiment contains 24 Kbytes of microcode memory, 8 Kbytes of local memory and 16 Kbytes of buffer memory. The CI hardware consists of three functional parts:

A set of mailbox memories—These memories provide a means of communication with all four LMs.

A Block Multiplex interface—This interface provides the path of communication to the host system.

A microcoded control section—This section executes the CI algorithms. It may be based on the 16-bit wide Am 2901 microprocessor (hereinafter referred to as the "2901").

The CI is designed for attachment to and interaction with the Block Multiplexer Channels of the host system and responds to multiple subsystem addresses.

Functional Overview

A Channel Interface (CI) is used as a front-end processor to a Lock Module (LM) for the purpose of locking and unlocking records and for performing diagnostic and maintenance functions. Because of this, the CI is geared in its hardware to perform the more time-consuming portions of the RLP workload.

Functionally, the CI performs all communication with the Host computer via a block mux channel. The CI communicates with the channel at a rate of 1.2 MegaBytes per second with 100 foot/I/O cables and a rate of 800 KiloBytes per second with maximum length 400 foot I/O cables in the preferred version. The communication is done by microprogram control. This allows a minimum of hardware to be used to implement the channel protocol mechanism.

Command packets, such as Lock Record, sent by the host to the RLP are decoded and reformatted by the CI. The reformatting allows the command packet to be put in a form that is more easily processed by the LM.

After a command packet is reformatted by the CI, it is stored in four Lock Request Buffers (LRBs). These four LRBs are connected to the four LMs. This allows each of the LMs to work on the command packet independently The LMs read data from the LRBs over an 8-bit bus and into their own working storages. The LMs then process the command packet and send the result to the CI's Delayed Response Buffers (DRBs). When all of the LMs have sent responses to the CI's command packet the CI evaluates the results in the DRBs. An evaluation consists of a majority vote on the contents of the DRBs. The contents that result in a majority are sent to the channel as the final response to the command.

The DRBs are used for another purpose besides that of a response buffer as illustrated above. When an asynchronous event, such as the release of a record occurs in an LM, the LM sends a packet to the CI's DRB. The CI recognizes this event and processes the packet.

There are a total of eight CIs in an RLP. Each of the CIs communicate with four LMs of which a maximum of three are on-line at any one time. Two CIs in different modules are connected to each host computer, generally to different IOPs. This provides redundant paths between the RLP and the host computers should one CI go down. Each CI consists of four PC cards: one is the microprocessor, two buffer, and one provides Interface, Local Store, and Scan/Set functionality A Channel Module (CM) consists of four CIs plus one power control and Scan/Set fanout PC card. Operands are 16 bits wide in the CI micro engine providing the required capability to process data passing through the channel interface. When considered together with the innate speed of the 2901 microprocessor, the 16-bit width provides a good match to the processing requirements of the CI.

We claim:

1. A process of controlling locking requests for data objects stored in a shared memory means in a multiprocessing system comprising a plurality of processors coupled to said shared memory means, and a central locking control means that is coupled to all of said processors, wherein said processors are able to obtain locks on said objects under the control of said locking control means, to utilize said objects and then to unlock said objects under the control of said locking control means comprising:

(A) transmitting requested lock entries from said processors to said locking control means that identify the requesting processors and the requested data objects upon which locks are sought by requesting processors, (B) entering into an odd number of at least three lock lists in said locking control means those lock entries that represent requested objects upon which no requesting processor of said plurality of processors is then maintaining a lock, (C) entering into an odd number of at least three queue lists, wherein said queue lists are equal in number to the number of said lock lists and each of said queue lists is associated with one of said lock lists those lock entries that represent requested objects upon which one of said processors is then maintaining a lock, (D) granting locks on the objects represented by lock entries in said lock lists, according to the following procedure of steps (1) and (2):

(1) comparing said lock entries in said lock lists to determine if a majority of said lock entries in said lock lists that are associated with a requested object match, and (2) granting a lock on a requested object for a requesting processor for which a majority of said lock entries do match, (E) obtaining a requested object for a requesting processor from said shared memory when a lock is granted on said requested object for said requesting processor, (F) utilizing said requested object upon which a lock has been obtained in said requesting processor, (G) unlocking said requested object after said requested object has been utilized in said requesting processor, (H) removing a lock entry for requested object from a lock list after said requested object is unlocked, and (I) moving lock entries for a requested object from said queue lists into the associated lock lists when no corresponding lock entries exist in said associated lock lists for said requested object.

2. In the process of claim 1 the improvement comprising utilizing the same lock entries that are utilized by the locking control means to obtain locks on requested objects for requesting processors to diagnose the operation of said locking control means for failures during operation of said locking control means.

3. In the process of claim 1 the improvement comprising the further steps of entering said lock list entries and said queue list entries into a spare lock list and a spare queue list respectively, and substituting said spare lock list and said spare queue list for a previously utilized lock list and its corresponding previously used associated queue list when said previously utilized lock list contains a lock entry that fails to agree with the majority of lock entries for a requested object when said lock entries are compared by a majority match.

4. In the process of claim 3 the improvement comprising utilizing the same lock entries that are utilized by the locking control means to obtain locks on requested objects for requesting processors to diagnose the operation of said locking control means for failures during operation of said locking control means.

* * * * *

UNITED STATES PATENT AND TRADEMARK OFFICE
CERTIFICATE OF CORRECTION

PATENT NO. : 5,140,685

DATED : August 18, 1992

INVENTOR(S) : Ralph E. Sipple, John O. Sjolander, John R. Jordan

It is certified that error appears in the above-identified patent and that said Letters Patent is hereby corrected as shown below:

Column 9 line 17, before "applications" insert -- The performance of Loosely Coupled Systems in other -- .

Signed and Sealed this

Twenty-fourth Day of August, 1993

Attest:

BRUCE LEHMAN

*Attesting Officer*  *Commissioner of Patents and Trademarks*